United States Patent [19]
Pannell

[11] 3,945,512
[45] Mar. 23, 1976

[54] APPARATUS FOR EMPTYING RECEPTACLES OF PARTICULATE MATERIAL
[76] Inventor: Robert T. Pannell, Crestline Road, Kennet Square, Pa. 19348
[22] Filed: Nov. 27, 1974
[21] Appl. No.: 527,888

[52] U.S. Cl. .............................. 214/17 DA; 47/1.1
[51] Int. Cl.² ......................................... B65G 65/46
[58] Field of Search........... 214/17 D, 17 DA, 44 A; 47/1.1

[56] References Cited
UNITED STATES PATENTS

| | | | |
|---|---|---|---|
| 2,831,274 | 4/1958 | Addicks | 214/44 A X |
| 3,243,057 | 3/1966 | Kelling | 214/17 DA |
| 3,613,926 | 10/1971 | Scroggins | 214/17 DA X |
| 3,743,117 | 7/1973 | Frezzo et al. | 214/17 DA |

Primary Examiner—Robert G. Sheridan

[57] ABSTRACT

Elongated receptacles, such as mushroom trays, are emptied of particulate material by positioning a screw conveyor transversely to the length of the tray and at one end of the tray. A winch, placed at the opposite end of a tray, with its cable attached to the frame of the screw conveyor, pulls the screw conveyor along the length of the tray to discharge the particulate matter out one side of the tray. Steering pads in the form of plates pivotally mounted to the rear portion of the screw conveyor frame may be selectively depressed by the operator standing on them and shifting his weight to aid in steering the screw conveyor through the length of the tray. The winch cable is connected to the frame of the screw conveyor by means of an L-shaped hook which acts on the lower rear portion of the frame. This enables the bottom portion of a shroud, which encloses the screw conveyor, to ride against the bottom of the tray, scrape the bottom of the tray, and remove any loose particulate matter left by the conveyor. Alternatively, the winch may be positioned on the screw conveyor itself and the winch cable secured to the end of the tray.

15 Claims, 6 Drawing Figures

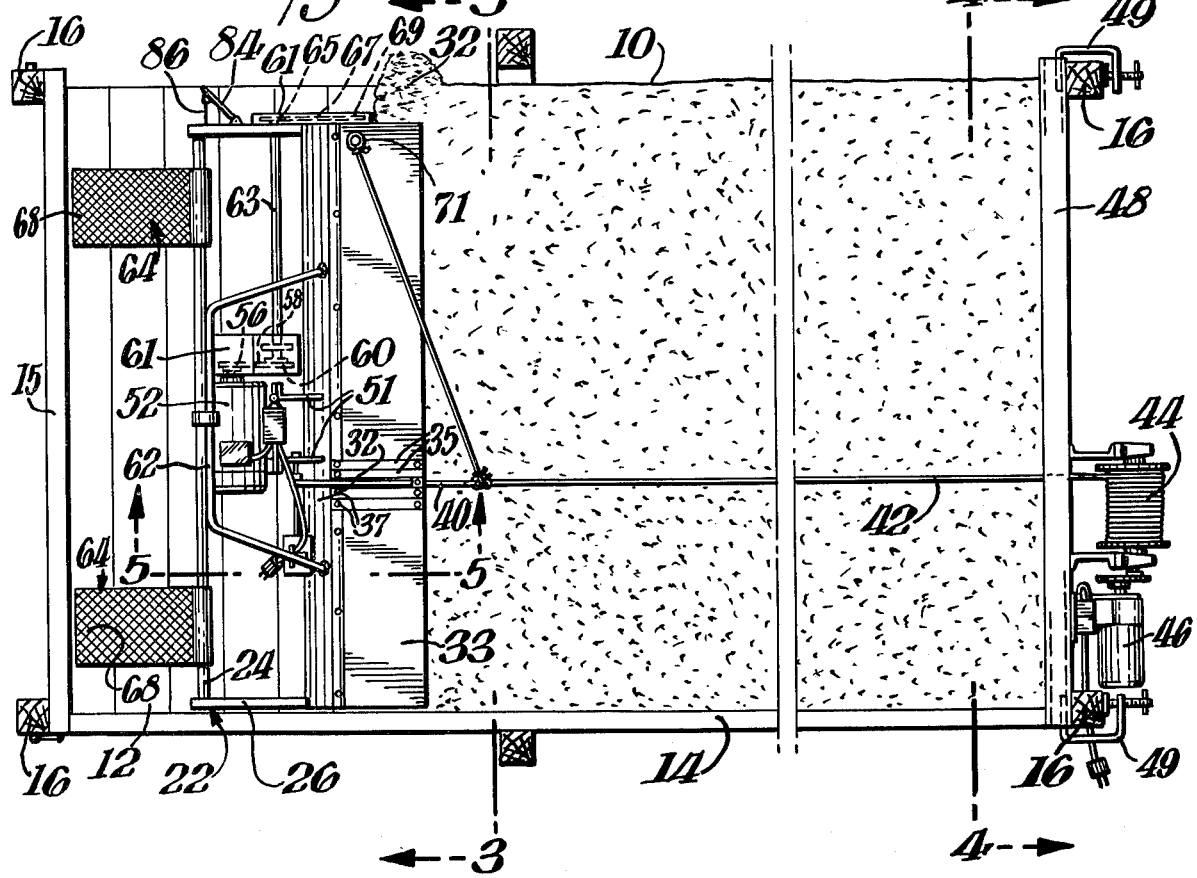
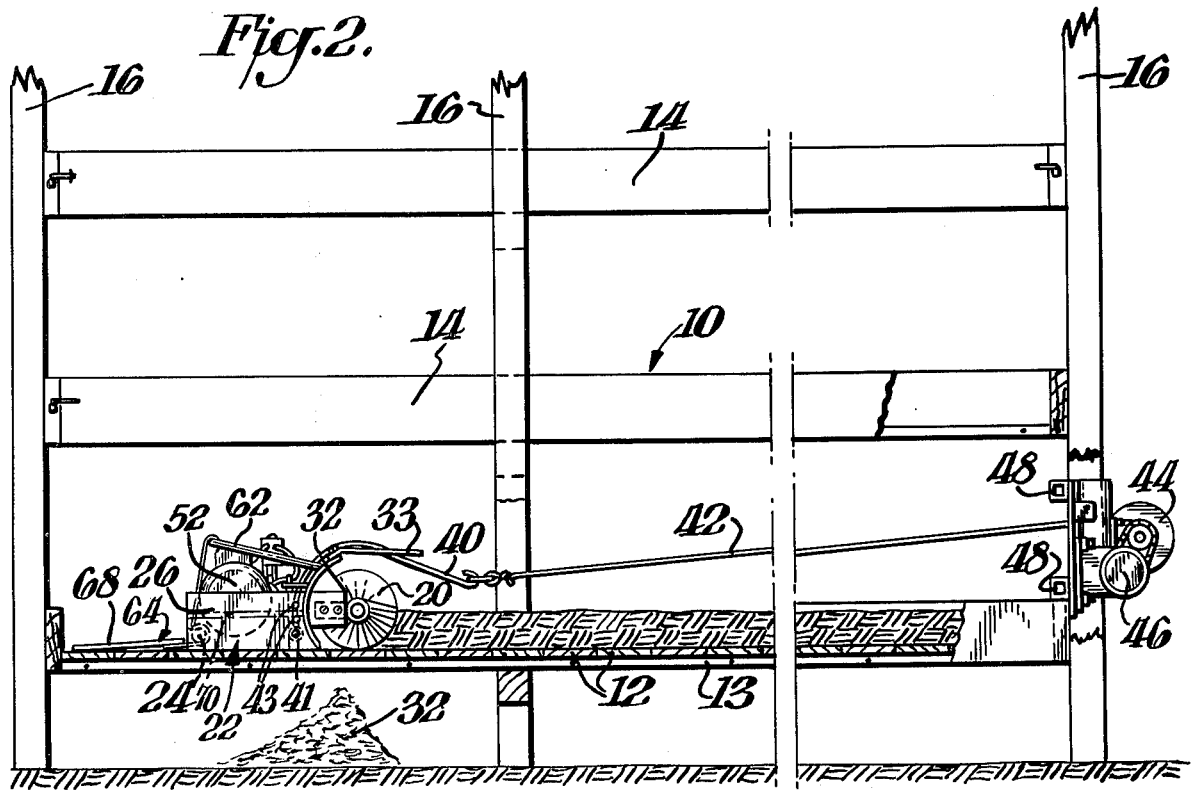

APPARATUS FOR EMPTYING RECEPTACLES OF PARTICULATE MATERIAL

BACKGROUND OF THE INVENTION

This invention relates to screw conveyors for use in emptying elongated receptacles of particulate matter.

In the greenhouse, mushroom house and other indoor adjuncts of the food industry, soil, compost or other nutrient material of a particulate nature is placed in elongated receptacles or trays in which the mushrooms and/or plants are grown. When it becomes necessary to remove or replace the soil or other nutrient material (with mushrooms, the compost is spent and must be removed after each crop) it is incumbent upon the grower to retain in most instances labor to manually shovel the soil out of the trays. In the case of mushrooms, long, horizontal conveyors are placed in the aisles between stacks of mushroom trays and the mushroom compost is shoveled onto the moving conveyor belt for removal from the mushroom house. This is particularly difficult due to the relatively close vertical spacing between the trays and the otherwise confined working area that generally exists in most mushroom houses. These conditions are such that emptying the trays becomes a sheer time-consuming, back-breaking effort which requires a disproportionate amount of time even when labor is available. With today's labor market, this is not always the case.

Accordingly, it is an object of this invention to provide an improved apparatus for emptying elongated receptacles of particulate manner.

Another object of this invention is to provide an apparatus for emptying elongated receptacles of particulate matter which obviates many of the disadvantages of the prior art techniques.

A further object of this invention is to provide an improved apparatus for emptying elongated receptacles of particulate matter which apparatus is light and easily handled by an operator.

BRIEF DESCRIPTION OF THE INVENTION

In accordance with this invention, an apparatus is constructed which is adapted to empty a receptacle of particulate matter. The receptacle has a bottom and at least one side such that a screw conveyor is adapted to be positioned transversely to said one side of the receptacle. The conveyor has a screw, a frame for mounting the screw, and a shroud surrounding the top and back of the screw adapted to engage and scrape the bottom of the receptacle. In a preferred embodiment of the invention, a first drive means is mounted on the frame for rotating the screw to discharge the particulate matter transversely of the receptacle away from the one side of the receptacle. A second drive means is adapted to propel the screw conveyor along the receptacle in a direction generally parallel to said one side. Linking means interconnects the second drive means, the screw conveyor and one end of the receptacle for this purpose.

In a particularly preferred embodiment of the invention, the second drive means is adapted to engage one end of the receptacle and the linking means connects the drive means and the screw conveyor. The linking means is connected to the lower, rear portion of the frame of the conveyor so as to maintain the shroud in contact with the receptacle bottom and steering pads are pivotally connected to the rear portion of the frame such that they may be drug along the bottom of the receptacle. The operator, by standing on the pads and selectively applying pressure by shifting his weight to one pad or the other, can aid in steering the screw conveyor along the receptacle. Preferably, the linkage to the frame is effected at an eccentric point along the width of the frame close to the one side of the bed thereby to compensate for the larger load which occurs opposite the discharge end of the conveyor.

In another embodiment of the invention, the second drive means is mounted on the screw conveyor itself and the linkage interconnects it with the end of the receptacle such that the conveyor may be pulled through the receptacle.

BRIEF DESCRIPTION OF THE DRAWINGS

The novel features that are considered characteristic of this invention are set forth with particularity in the appended claims. The invention, itself, however, both as to its organization and method of operation, as well as additional objects and advantages thereof will be best understood from the following description when read in connection with the accompanying drawings, in which:

FIG. 1 is a plan view of a typical mushroom tray and an apparatus constructed in accordance with this invention in the process of emptying such tray;

FIG. 2 is a side elevation view of the apparatus and mushroom tray depicted in FIG. 1 with a portion of one side shown partially in section;

DETAILED DESCRIPTION OF THE PREFERRED EMBODIMENT

Figure 3:
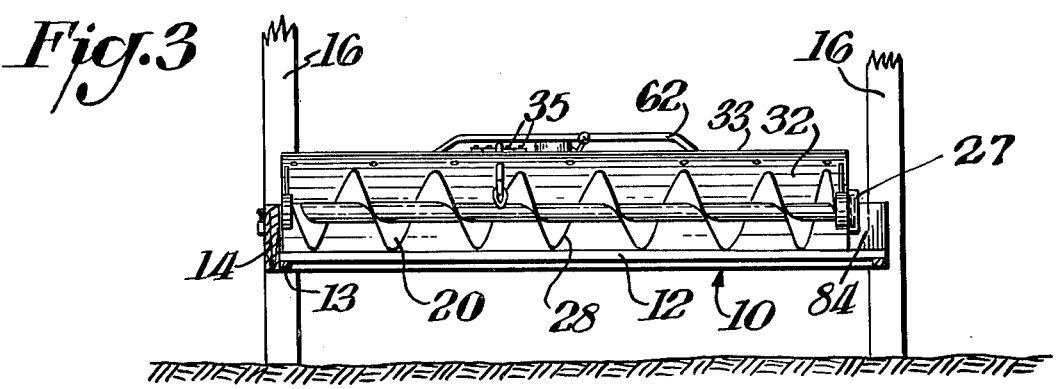
FIG. 3 is a sectional end elevation view of the screw conveyor of FIG. 1 taken along the section lines 3—3.
Figure 4:
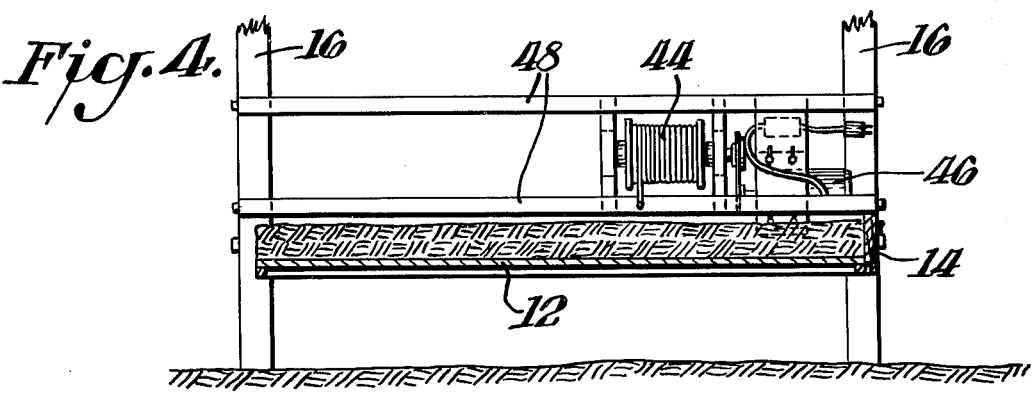
FIG. 4 is a sectional end elevation view of the tray and winch of FIG. 1 taken along the section line 4—4.
Figure 5:
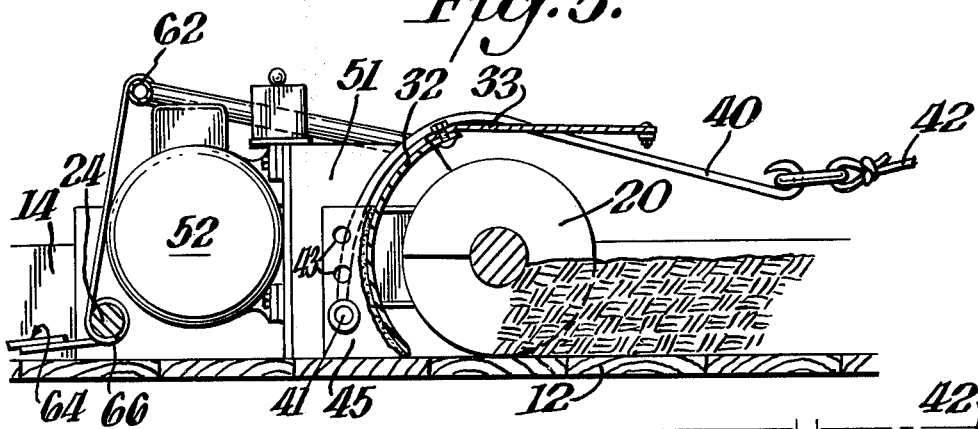
FIG. 5 is an enlarged, fragmentary side elevation view of a pivotal mounting for the drive arm illustrated in FIG. 1 taken along the section line 5—5.

There may be seen in the drawings of FIGS. 1 and 2 an elongated tray or receptacle 10 of the type that is used typically in the culture of mushrooms. It is to be understood that such application is purely by way of illustration and is in no way to be construed as limitational of the uses to which the apparatus may be put, i.e., emptying particulate matter from receptacles. While the invention is described in conjunction with particulate matter for growing plants, it may also be used for removing any type of particulate matter such as grain, malt and the like from trays or receptacles.

A typical tray 10 has a flat bottom 12 supported by longitudinal braces 13 and a pair of sides of which only a single side 14 is shown. Typically, in mushroom houses the side (not shown) adjacent the aisle is removable to facilitate the cleaning of the bed. The trays also have ends 15 which may be secured to the sides 14. The tray 10 is supported by legs or posts 16 at each corner which may be either continuous from top to bottom or may be in the form of individual legs for each tray, each tray being stacked upon a lower tray. Continuous legs 16 are illustrated. Typically, the trays are made of wood, although any suitable, rigid, strong material may be used.

According to this invention, a screw conveyor 20 is positioned across the width of the tray 10. One side, the aisle side, of the tray is removed such that the aisle side of the tray's contents are exposed. The screw conveyer 20 is mounted within a frame 22 which may include essentially a rear structural cross member 24 positioned between end plates or flanged mounting pieces 26 and a shroud 32 secured to the end pieces as by welding. Tabs 27, which may be welded to the front portion of the shroud 32 at either end house bearings (not shown). These bearings hold an auger or screw 28 forwardly of the frame 22. The screw 28 may be conventional and contain a spiral flanged portion which actually effects the transport of the particulate matter depicted by the numeral 30. The shroud is positioned relatively close to the back peripheral portions of the screw 28, thereby to aid in discharging the particulate matter. The shroud 32 covers the rear portion of the screw 28 and is secured to the frame 22 by suitable bolts or other means such as welding as is depicted in the drawing. A horizontal plate 33 is bolted to the top portion of the shroud 32 and extends forwardly over the top of the screw 28 to prevent the particulate matter from being thrown upwardly. Shield strips 35 form a portion of the plate 33 to facilitate the lateral positioning of a linking member or drive arm 40 as will be described. The shield strips 35 are bolted as at 37 to the shroud 32. The lower portion of the shroud 32 may be reinforced to form a blade (not shown) so that as it scrapes along the bottom 12 of the tray 10 it is better able to remove any remaining particulate matter.

The linking member or drive arm 49 is L-shaped and pivotally secured at one end of the backside of the shroud 32 so as to provide a means of propelling or pulling the screw conveyor along the length of the tray. A propelling force is applied in the desired direction (typically the length of the tray) at the lower portion of the shroud 32. This permits the shroud to remain in contact with the bottom of the tray and thereby scrape up any particulate material not removed by the auger. Specifically, the pivotally secured end of the drive arm 40 is povitally attached to a pivot shaft 41 which is pivotally mounted in one of several holes 43 formed in tabs 45 secured to the backside of the shroud 32 as by welding or other suitable means. The holes 43 are spaced vertically to permit the point at which the pulling force is applied to the screw conveyor to be adjusted vertically simply by positioning the pivot shaft 41 in the appropriate hole. A remaining ring 49 keeps the pivot shaft 41 securely held within the given hole.

The other end of the drive arm 40 is connected to a cable 42 which is taken up by a winch drum 44. The winch drum is driven by a suitable electric motor 46. The motor 46 and winch drum 44 combination are mounted on a frame comprising two horizontally disposed bars 48 which may be clamped as by a clamp means 49, to the end posts 16 at the end of each tray 10. Alternatively, these bars may be changed to a plate-type mounting and clamped to the tray itself. A control and reversing switch for the motor 46 may be connected through a length of wire (not shown) of sufficient length such that the operator of the screw conveyor may control the operation of the winch from a remote location. The wire may be held on a spring loaded reel of conventional design to insure the wire is automatically taken up and does not become entangled in the screw conveyor.

A prime mover or motor 52 for driving the screw is mounted to support members 51 which are secured as by welding to the back side of the support members 51 which are secured as by welding to the back side of the shroud 32. A drive sprocket 56 is journaled to the drive shaft of the motor. An end chain 58 links the drive sprocket 52 to a driven gear 60 which may be journaled into the end of a drive shaft 63. The drive shaft 63 has a second driven gear 65 journaled on its other end to drive through a second chain 67 a third driven gear 69 journaled onto the end of the shaft of the screw 28. A protective housing 61 may enclose the end sprocket 52, a gear 60, and chain 58.

To facilitate steering of the screw conveyor, a handle bar 62 may be welded to the shroud and extend backwardly and upwardly. The handle bar is gripped by the operator as will be described. A pair of foot pedals 64 are pivotally mounted at their front portion 66 to the structural member 24 with the rear portion 68 of each foot pedal being permitted to drag along the bottom 12 of the tray.

In this manner, the operator may grasp the handle bar 62 and, standing (or stooping) on the foot pedals 64, energize the screw motor 52 which drives the screw and the winch motor 46. The rotary operation of the screw 28 forces the particulate matter in the bed out through the open end of the tray into the aisle. A conventional conveyor belt may be positioned in the aisle for removing the screw conveyor discharged particulate matter from the area. Alternatively, carts or other suitable conveyances may be positioned to receive the discharged particulate. The winch forces the threads or blades of the auger to bite into the particulate matter as the screw conveyor is drawn along the length of the bed (to the right in the drawing). The operator now by selectively shifting his weight from one foot pedal 64 to the other, thereby to vary the drag, may, in effect, steer the screw conveyor. It is noted that the drive arm 40 is connected eccentrically to the frame of the screw conveyor. Specifically, the drive arm 40 is connected close to the side 14 of the tray since, as the particulate matter is propelled to the aisle, there is a greater dragging force on the inside portion of the screw conveyor (that portion away from the aisle) than elsewhere. Hence, this eccentric load is compensated for.

Depending upon the density of the particulate matter, the drive arm pivotal mounting shaft 41 is repositioned to a lower or high hole 43. For heavier material, a lower hold is selected to lower the point of thrust and thereby maintain the lower end of the shroud in contact with the bottom 12 of the tray to scrape and remove any material missed by the screw. The screw is formed typically to approximate or be slightly less than the width of the tray. A guide skid 70 may be mounted to the end piece adjacent the side wall 14 to permit the frame to slide along the side 14 of the bed and be guided thereby. The auger or screw is rotated such that the weight of the particulate matter forces the screw conveyor and guide skid against the side wall 14. The guide skid is shaped to reduce friction between the screw conveyor and tray side.

The apparatus described is thus seen to be relatively light in weight since the motor for the screw can be relatively lightweight. The winch motor which drives the entire screw conveyor along the length of the tray is mounted in a separate frame remote from the screw conveyor. Thus, it is a relatively simple matter for two men to quickly assemble the apparatus, place it in the tray, empty the tray and then reposition the apparatus in a second tray. The repositioning is accomplished simply by unclamping the bars 48 from the end post, disconnecting the cable from the drive arm 40, repositioning the winch assembly at the end of a new tray, lifting the screw conveyor out of the empty tray, and repositioning it in the new tray to be emptied. Finally, the cable is reconnected and the next tray is ready to be emptied simply by energizing first the screw conveyor motor and allowing the conveyor to dig its way to the bottom of a tray at which time the winch motor is energized. Preferably, the winch motor may be adjustable in speed.

In the apparatus described, by vertically positioning the point at which the drive arm 40 acts, such that the drive arm acts upon the lower rear portion of the screw conveyor, the shroud is maintained in good contact with the bottom of the tray and does not tend to lift up. Furthermore, the screw conveyor may be steered by the pivotal foot pedals. Sideways stability is attained by positioning laterally the point at which the drive arm acts. This is accomplished by removal and replacement of the strips 35 until the desired lateral location is attained.

In another embodiment of the invention, the cable may be split as seen most clearly in FIG. 1. In this arrangement, the cable is terminated in a Y-shaped configuration and is connected to two point on the frame 22 — the one is described, the other 71 at a point on the plate 33 contiguous the discharge end of the conveyor. This tends to stabilize the wobble which can occur with movement of the screw conveyor if only a single drive point is used. Thus, with the two point drive, if the one end of the screw tends to lag, more tension is applied to it and less tension is applied to the other, which is now in a more forward position. Thus, wobble is automatically compensated for and neutralized. Also, a scraper 22 may be mounted to the frame to engage the screw and insure that the threads are clean.

A wiper blade 84 may be secured to the aisle or discharge side to permit the machine to be used in wider trays without increasing the width of the machine itself. An adjusting arm 86 is pivotally mounted to engage the wiper blades and act as a brace which controls the angle of the wiper blade and hence permits the adjustment of the effective width of the conveyor. The wiper blade typically would have a height slightly less than that of the screw conveyor.

Figure 6:
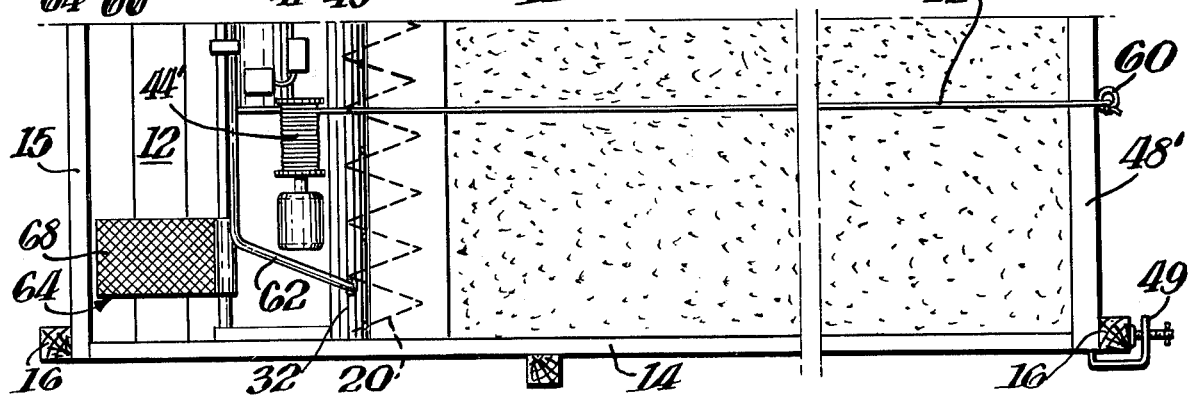
FIG. 6 is a partial plan view of an alternative embodiment of the invention.

A further embodiment of the invention is illustrated in FIG. 6. In this embodiment, the construction is substantially the same as previously described in conjunction with FIGS. 1–5 with one exception. In this instance a winch drum 44' and its drive motor 49' are mounted to the upper backside of the shroud 32. The cable 42 from the drum 44' has its end connected to an eye bolt 68 secured to a single horizontal bar 48' which may be clamped as by clamps 49 to the end posts of the tray. This embodiment, while heavier than that illustrated in FIGS. 1–5 is useful where space at the ends of the trays is limited. Otherwise, the operation is substantially the same as previously described.

The use of separate motors mounted one on the conveyor, one on the tray, is preferred because of the lighter weight machine. In the embodiment of FIG. 6, the two motors 49' and 52 may be combined in a single motor and suitable gearing and clutches employed to obtain the desired operating speeds and control. Further, instead of the chain drives, suitable transmissions may be employed.

It is obvious that many embodiments may be made of this inventive concept, and that many modifications may be made in the embodiments hereinbefore described. Therefore, it is to be understood that all descriptive material herein is to be interpreted merely as illustrative, exemplary and not in a limited sense. It is intended that various modifications which might readily suggest themselves to those skilled in the art be covered by the following claims as far as the prior art permits.

What is claimed is:

1. In apparatus for emptying an elongated receptacle of particulate matter, said receptacle having a bottom and at least one side, said apparatus having a conveyor comprising a screw, a frame for mounting said screw, said screw being horizontally disposed and adapted to be positioned transversely to the length of said receptacle, a shroud cooperating with said screw to effect the lateral transport of said particulate matter, and adapted to engage the bottom of said receptacle, said apparatus comprising, in combination:

first drive means mounted on said frame for rotating said screw, thereby to discharge said particulate material transversely of said receptacle away from said one side and to urge said screw against said one side to be guided thereby, second drive means effecting a pulling force at a fixed point at the end of said receptacle toward which said screw conveyor is to be moved, cable linking means interconnecting said second drive means, a frame portion of said screw conveyor and said end of said receptacle for moving said screw conveyor lengthwise of said receptacle, thereby to empty said receptacle, and auxiliary means for assisting in the steering of said screw conveyor.

2. Apparatus according to claim 1 wherein said second drive means includes a winch having said cable interconnecting said linking means and said end of said receptacle.

3. Apparatus according to claim 1 wherein said linking means is positioned to act eccentrically on said frame at a point along said one side of said receptacle.

4. Apparatus according to claim 1 wherein said linking means is connected to the back and bottom portion of said frame thereby to maintain said shroud in engagement with the bottom of said receptacle.

5. An apparatus according to claim 1 wherein said second drive means is adapted to be mounted on said frame.

6. Apparatus according to claim 1 wherein said second drive means is adapted to be mounted at one end of said receptacle.

7. Apparatus according to claim 6 wherein:

said second drive means includes a winch having a cable connected to said linking means, and said linking means is an L-shaped member having one end connected to said cable and the other end connected to the back and bottom portion of said shroud thereby to maintain said shroud in engagement with the bottom of said receptacle.

8. Apparatus according to claim 7 wherein said linking means is positioned to act eccentrically on said frame at a point away from said one side of said receptacle.

9. Apparatus according to claim 6 wherein said linking means is positioned to act upon two spaced transverse points of said apparatus thereby to maintain the angle of attack of said screw conveyor within said receptacle.

10. Apparatus according to claim 6 which also includes a pair of plates each pivotally connected to the back portion of said frame and adapted to drag along the bottom of said receptacle thereby to permit friction steering of said screw conveyor as it moves through the length of said receptacle.

11. Apparatus according to claim 10 herein said linking means is connected to the back and bottom portion of said frame thereby to maintain said shroud in engagement with the bottom of said receptacle.

12. Apparatus according to claim 6 which includes a guide skid positioned on said frame so as to engage said receptacle side, the movement of said screw urging said skid against said side.

13. Apparatus according to claim 6 which includes a wiper blade positioned on the end of said frame away from the discharge side of said apparatus, thereby to assist in the discharge of said material in wide receptacles.

14. Apparatus according to claim 5 which includes a wiper blade positioned on the end of said frame away from the discharge side of said apparatus, thereby to assist in the discharge of said material in wide receptacles.

15. An apparatus according to claim 1 in which said cable linking means includes a pivotable mounting affording the application of the said pulling force at different angles relative to said bottom of said receptacle.

* * * * *